United States Patent
Chueh

(10) Patent No.: US 6,419,251 B1
(45) Date of Patent: Jul. 16, 2002

(54) PROPELLING SCOOTER

(76) Inventor: Hung-Che Chueh, 3rd Fl., No. 398, Ta Tun 6th St., Taichung (TW)

( * ) Notice: Subject to any disclaimer, the term of this patent is extended or adjusted under 35 U.S.C. 154(b) by 0 days.

(21) Appl. No.: 09/670,649

(22) Filed: Sep. 27, 2000

(51) Int. Cl.$^7$ ................................................ B62M 1/00

(52) U.S. Cl. ........................ 280/221; 280/220; 280/252; 280/258; 74/594.1; 74/594.2; 74/606 R

(58) Field of Search ................................ 280/220, 221, 280/252, 253, 255, 258; 74/561, 125, 594.1, 594.2, 606 R

(56) References Cited

U.S. PATENT DOCUMENTS

| | | | |
|---|---|---|---|
| 907,562 A | * 12/1908 | Boettcher | 280/222 |
| 2,498,409 A | * 2/1950 | Franklin | 280/222 |
| 3,415,540 A | * 12/1968 | Portnoff | 280/221 |
| 4,186,934 A | * 2/1980 | Collings | 280/221 |
| 4,846,488 A | * 7/1989 | Szadkowski | 280/221 |
| 5,192,089 A | * 3/1993 | Taylor | 280/221 |
| 5,335,927 A | * 8/1994 | Islas | 280/255 |
| 5,765,441 A | * 6/1998 | Suziki | 74/136 |
| 6,189,907 B1 | * 2/2001 | Nelson et al. | 280/258 |

FOREIGN PATENT DOCUMENTS

DE 19602343 A1 * 7/1997

* cited by examiner

Primary Examiner—Brian L. Johnson
Assistant Examiner—Daniel Yeagley
(74) Attorney, Agent, or Firm—Alan Kamrath; Rider Bennett, Egan & Arundel, LLP

(57) ABSTRACT

A propelling scooter includes a chassis, a front wheel steerably attached to a front end of the chassis, a rear wheel rotatably attached to a rear end of the chassis and an elongated pedal disposed longitudinally above the chassis. The pedal has a backward end and a forward end. The pedal is pivotally connected to the chassis between the ends thereof and is adapted to sway relative to the chassis. A first shaft laterally extends through and is rotatably supported on the chassis. The scooter further includes a driving pulley securely mounted around the first shaft, a driven pulley securely attached to a center of the rear wheel, and a primary flexible drive piece reeved around the driving pulley and the driven pulley to transmit rotation from the first shaft to the rear wheel such that the scooter may move forward when the first shaft is rotated relative to the chassis in a correct direction. Additionally, means are provided for transmitting motion from the pedal to the first shaft in a manner of causing rotation of the first shaft invariably in the correct direction.

17 Claims, 8 Drawing Sheets

PROPELLING SCOOTER

BACKGROUND OF THE INVENTION

1. Field of the Invention

The present invention relates to a scooter and, more particularly, to a scooter which can be propelled forward continuously.

2. Description of Related Art

A scooter is a vehicle for a user, especially a child, to stand on by one foot and to propel it by the other foot thrusting against the ground. As shown in FIG. 8, such a scooter typically includes a head tube (70) formed at a front end of a narrow board (71), with a front wheel (72) steerably attached to the head tube (70) and a rear wheel (73) rotatably attached to a rear end of the board (71).

Although this conventional scooter is popular, it still has the following disadvantages:

1. intermittent propelling:

Because it is pushed forward only at each time the other foot touches the ground, the conventional scooter is propelled intermittently and is moved forward at a relative slow speed.

2. leg restriction:

Because one foot must remain on the board (71) to support the body of the user, this foot can not be moved about or lifted while the scooter moves along.

3. insufficient safety

Because the player must lower the other foot to touch the ground and lift it away from the ground time after time, it is not easy for the user to keep balance on the scooter, especially for a young child.

Therefore, it is an objective of the invention to provide a scooter to mitigate and/or obviate the aforementioned problems.

SUMMARY OF THE INVENTION

The object of the present invention is to provide a scooter which can be propelled forward continuously as desired.

Another object of the present invention is to provide a scooter which can provide an exciting sport for leisure.

Still another object of the present invention is to provide a scooter which has high safety.

Other objects, advantages and novel features of the invention will become more apparent from the following, detailed description when taken in conjunction with the accompanying drawings.

DETAILED DESCRIPTION OF THE PREFERRED EMBODIMENT

Figure 1:
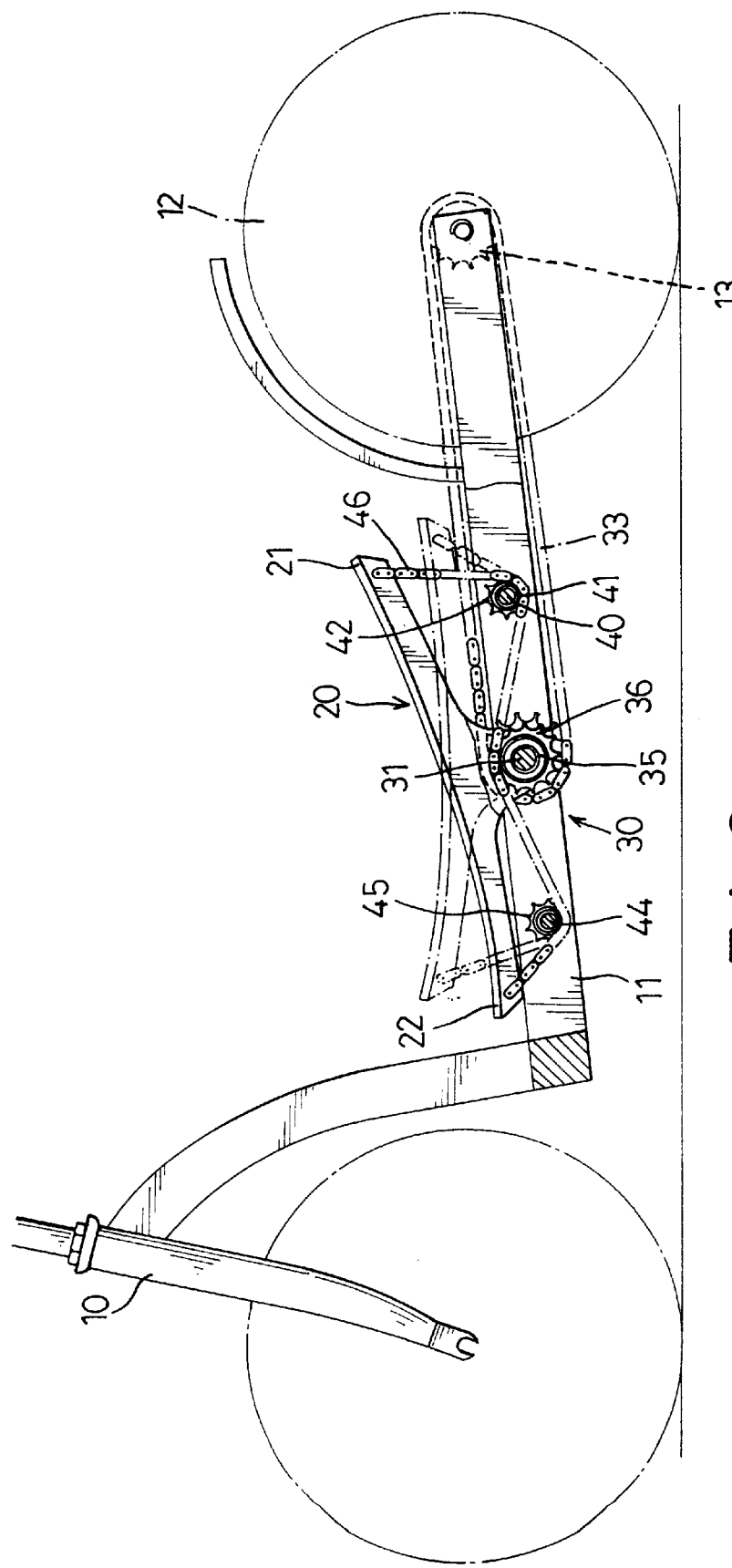
FIG. 1 is a fragmentary cross-sectional view of a preferred embodiment of a scooter in accordance with the present invention.
Figure 2:
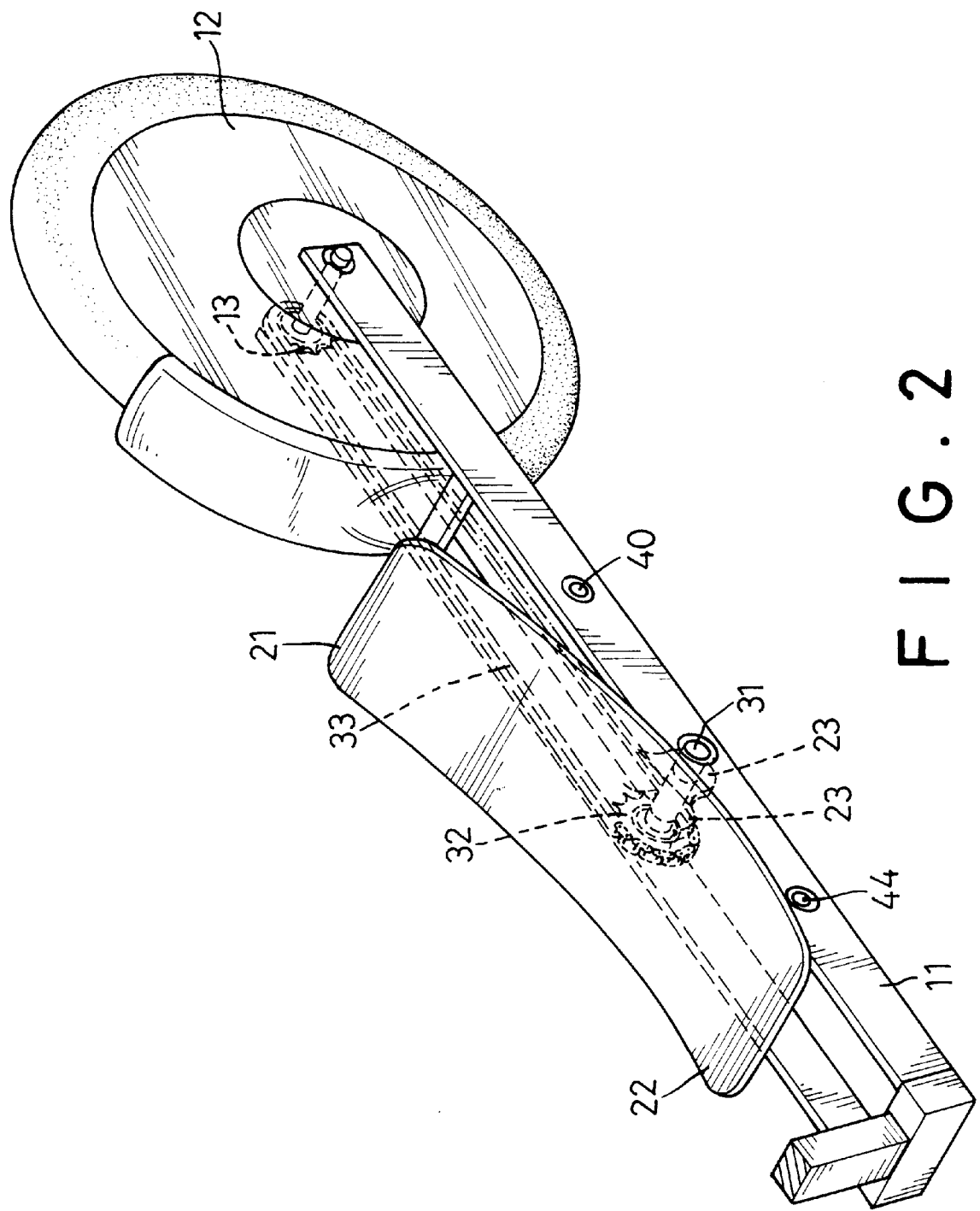
FIG. 2 is a fragmentary perspective view of the preferred embodiment of the scooter shown in FIG. 1.

Referring to FIGS. 1 and 2, a scooter in accordance with the present invention includes a chassis (11) having a front end and a rear end. The chassis (11) preferably has a head tube (10) formed at the front end thereof. A front wheel (not numbered) is steerably attached to the front end of the chassis (11) or to the head tube (10), such as by way of a front fork, and a rear wheel (12) is rotatably attached to the rear end of the chassis (11).

The scooter further includes an elongated pedal (20) disposed longitudinally above the chassis (11). The pedal (20) has a backward end (21) and a forward end (22), with a pair of downwardly extending wings (23) formed between the ends (21, 22) thereof. The pedal (20) is pivotally connected to the chassis (11), by means of a first shaft (31) which laterally extends through the chassis (11) and the wings (23), so that the pedal (20) may sway forward and backward relative to the chassis (11), as shown in FIG. 1.

The first shaft (31) is rotatably supported on the chassis (11). The scooter is similar to a bicycle in that a driving sprocket (32) is securely mounted around the first shaft (31) and a driven sprocket (13) is securely attached to a center or the rear wheel (12), with a primary chain (33) reeved around the sprockets (32, 13) to transmit rotation from the first shaft (31) to the rear wheel (12). In this manner, the scooter is moved forward when the first shaft (31) is rotated relative to the chassis (11) in a correct direction, which is counterclockwise as viewed from FIG. 1.

According to the specification of the present invention, the terms 'correct direction' is referred to as a direction in which the first shaft (31) is rotated to drive the driven sprocket (13) in such a way that the vehicle is moved forward, as mentioned above, and the terms 'normal direction' is referred to as the same direction of other parts of the scooter.

Additionally, there is provided means (30) for transmitting motion from the pedal (20) to the first shaft (31) in a manner of causing rotation of the first shaft (31) invariably in the correct direction.

Figure 3:
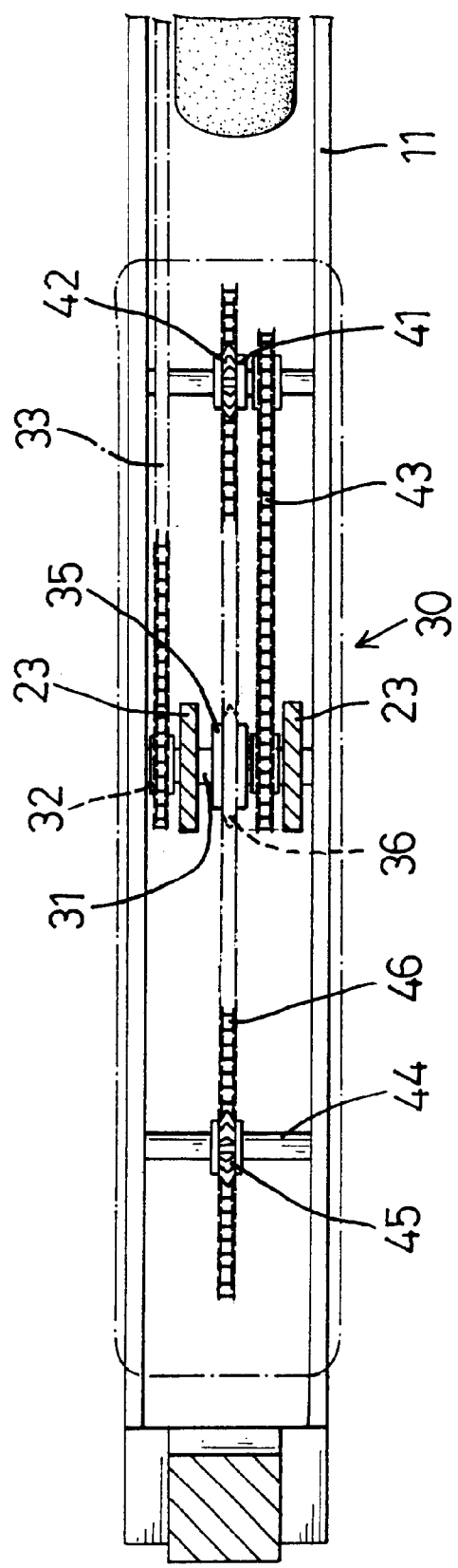
FIG. 3 is a fragmentary bottom view of the preferred embodiment of the scooter shown in FIG. 1.
Figure 4:
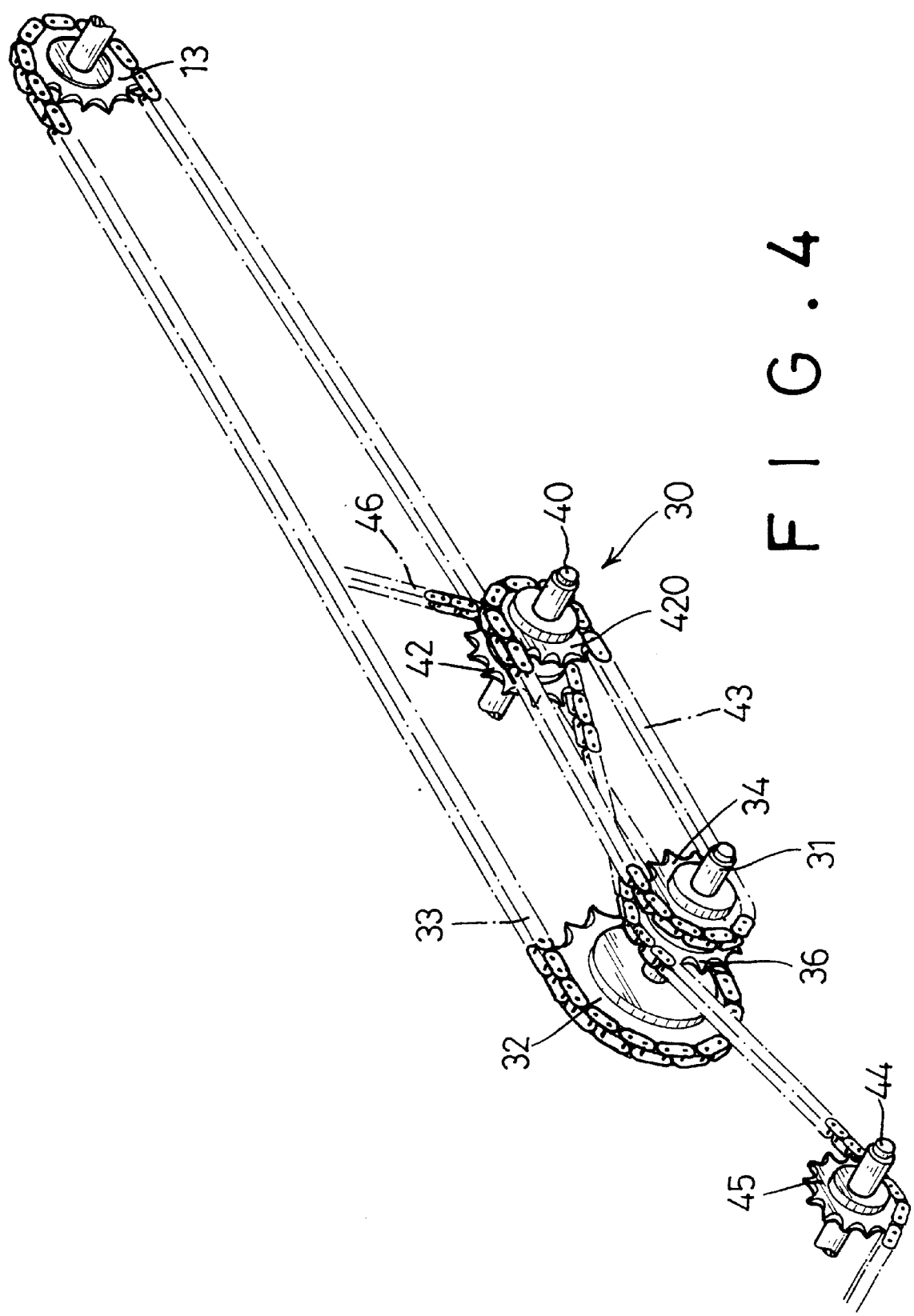
FIG. 4 is a perspective view of motion-transmitting, means involved in the preferred embodiment of the scooter of FIG. 1.
Figure 5:
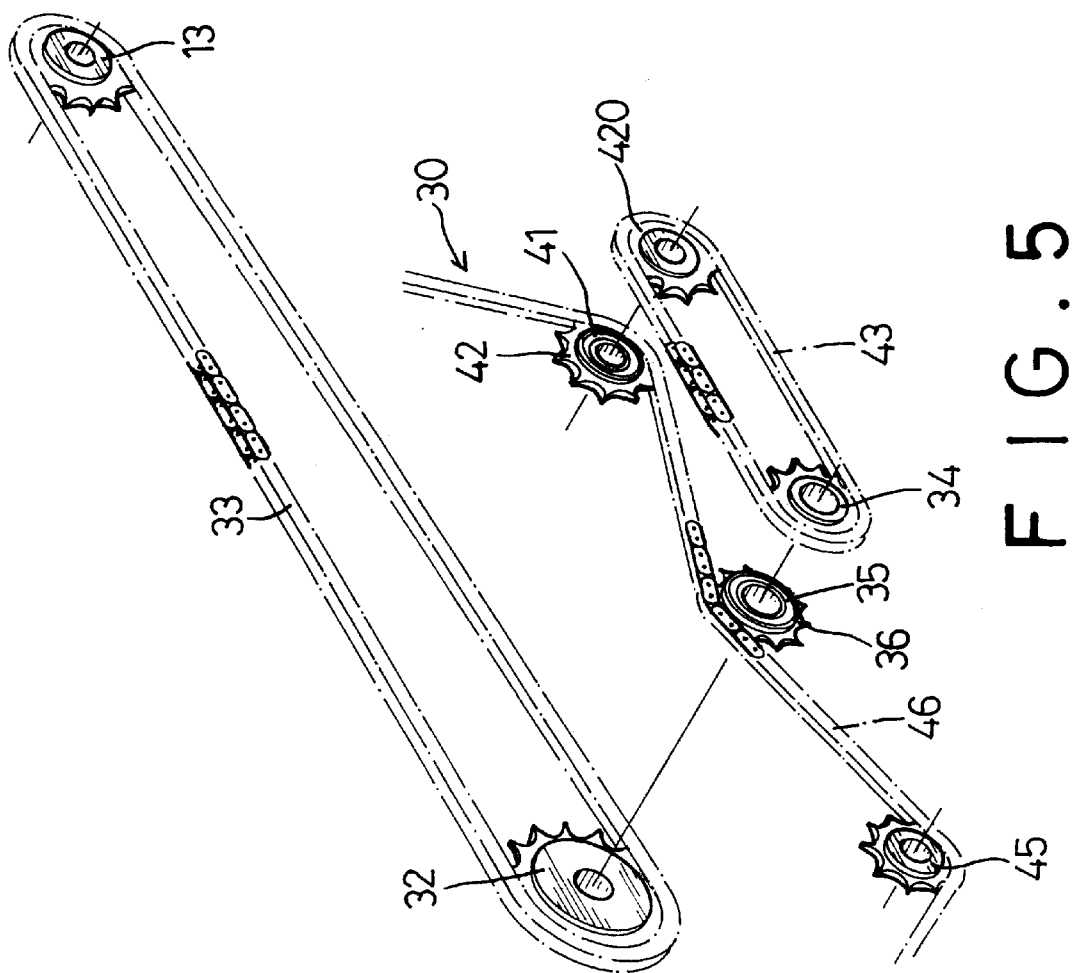
FIG. 5 is an exploded perspective view of the motion-transmitting, means shown in FIG. 4.

Referring to FIGS. 3, 4 and 5, a preferred embodiment of the means (30) includes a first sprocket (36), a third sprocket (45) and a fifth sprocket (42) mounted around respective first, second and third shafts (31, 44, 40), among which the second and third shafts (44, 40) also laterally extend through and are rotatably supported on the chassis (11), except that the second shaft (44) is in front of the first shaft (31) and the third shaft (40) is behind the first shaft (31).

Each of the first and fifth sprockets (36, 42) is formed with a one-way mechanism (35,41), such as a ratchet gearing, unidirectional bearing and the like, that couples the sprocket (36, 42) to the associated shaft (31, 40) when the sprocket (36, 42) is rotated in the normal direction and uncouples the sprocket (36, 42) from the associated shaft (31, 40) when the sprocket (36, 42) is rotated in the opposite direction.

In addition, there is a first secondary chain (46) running around a top edge of the first sprocket (36) and bottom edges of the third and fifth sprockets (45, 42), with two ends of the chain (46) respectively attached to the ends (21, 22) of He pedal (20), as shown in FIG. 1.

The arrangement of the first secondary chair (46) enables the sprockets (36, 45, 42) to be rotated with the swaying motion of the pedal (20), especially the first and fifth sprockets (36, 42) to be rotated in opposite directions. The sprockets (36, 42) are thus complementarily coupled to their associated shafts (31, 40) due to their one-way mechanisms (35, 41), resulting in rotation of an alternate one of the first and third shafts (31, 40) in the correct or the normal direction.

For the purpose of rotating the first shaft (31) during the period when the first sprocket (36) is uncoupled from the shaft (31), the embodiment of the means (30) further includes a second sprocket (34) securely mounted around the first shaft (31) at a side of the first sprocket (36), a fourth sprocket (420) securely mounted around the third shaft (40) at a side of the fifth sprocket (42) and a second secondary chain (43) reeved around the second and fourth sprockets (34, 420), thereby additionally transmitting the correct rotation from the third shaft (40) to the first shaft (31).

As shown in FIGS. 1, 2 and 5, the inventive scooter can be moved forward by a user (not shown) standing on the pedal (20) with his/her feet on the ends (21, 22) to sway the pedal (20) like a seesaw.

As the rear end (21) of the pedal (20) is being pressed down, the front end (22) goes up, and the first secondary chain (46) is pulled in such a direction that the first sprocket (36) is rotated in the normal direction and the fifth sprocket (42) in the opposite direction, i. e. counterclockwise for the first sprocket (36) and clockwise for the fifth sprocket (42) as viewed from FIG. 1.

It is in these directions that the first sprocket (36) is coupled to the first shaft (31) and the fifth sprocket (42) is uncoupled from the third shaft (40), as mentioned above. The first shaft (31) is thus rotated in the correct direction with the first sprocket (36), and so the scooter is moved forward.

Similarly, as the front end (22) of the pedal (20) is being pressed down, the rear end (21) goes up, and the first secondary chain (46) is pulled so that the fifth sprocket (42) is rotated in the normal direction but the first sprocket (36) in the opposite direction, i. e. counterclockwise for the fifth sprocket (42) and clockwise for the first sprocket (36) as viewed from FIG. 1.

Now the first sprocket (36) is uncoupled from the first shaft (31) and the fifth sprocket (42) is coupled to the third shaft (40), which is hence rotated with the fifth sprocket (42). The first shaft (31) is then rotated in the correct direction by the third shaft (40), through the second secondary chain (43) around the second and fourth sprockets (34, 420), and so the scooter is moved forward.

Figure 6:
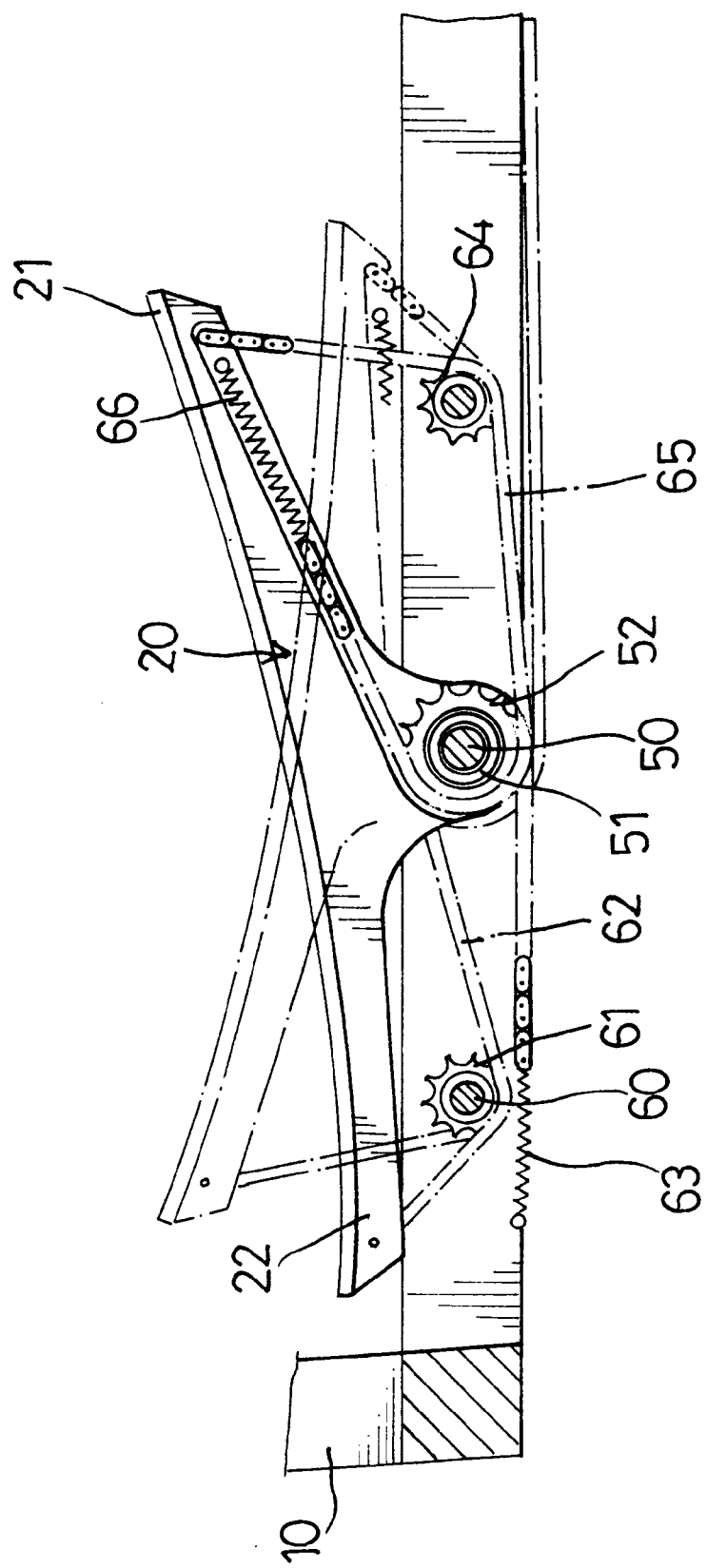
FIG. 6 is a fragmentary cross-sectional view of another preferred embodiment of the scooter in accordance with the present invention.
Figure 7:
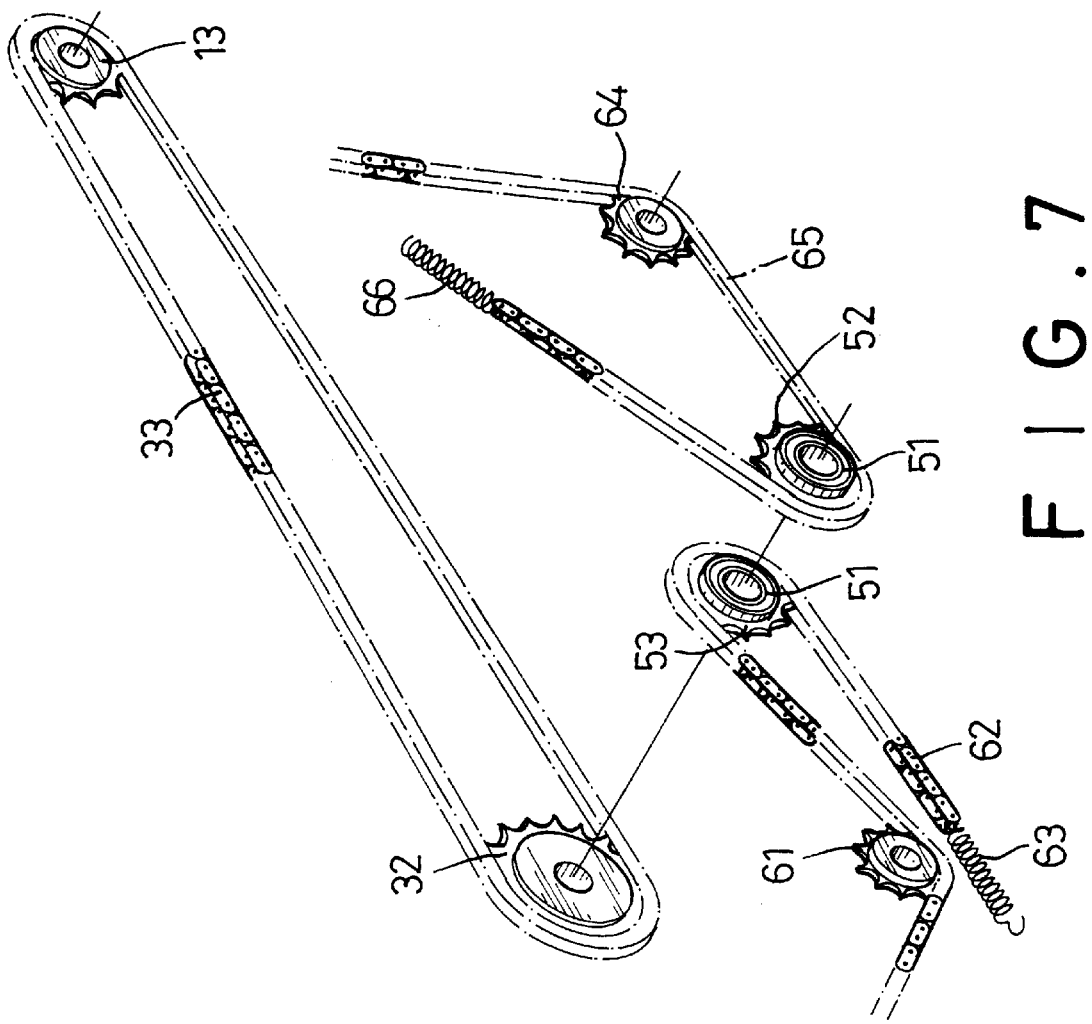
FIG. 7 is a perspective view of the motion-transmitting means involved in the preferred embodiment of the scooter of FIG. 6.
Figure 8:
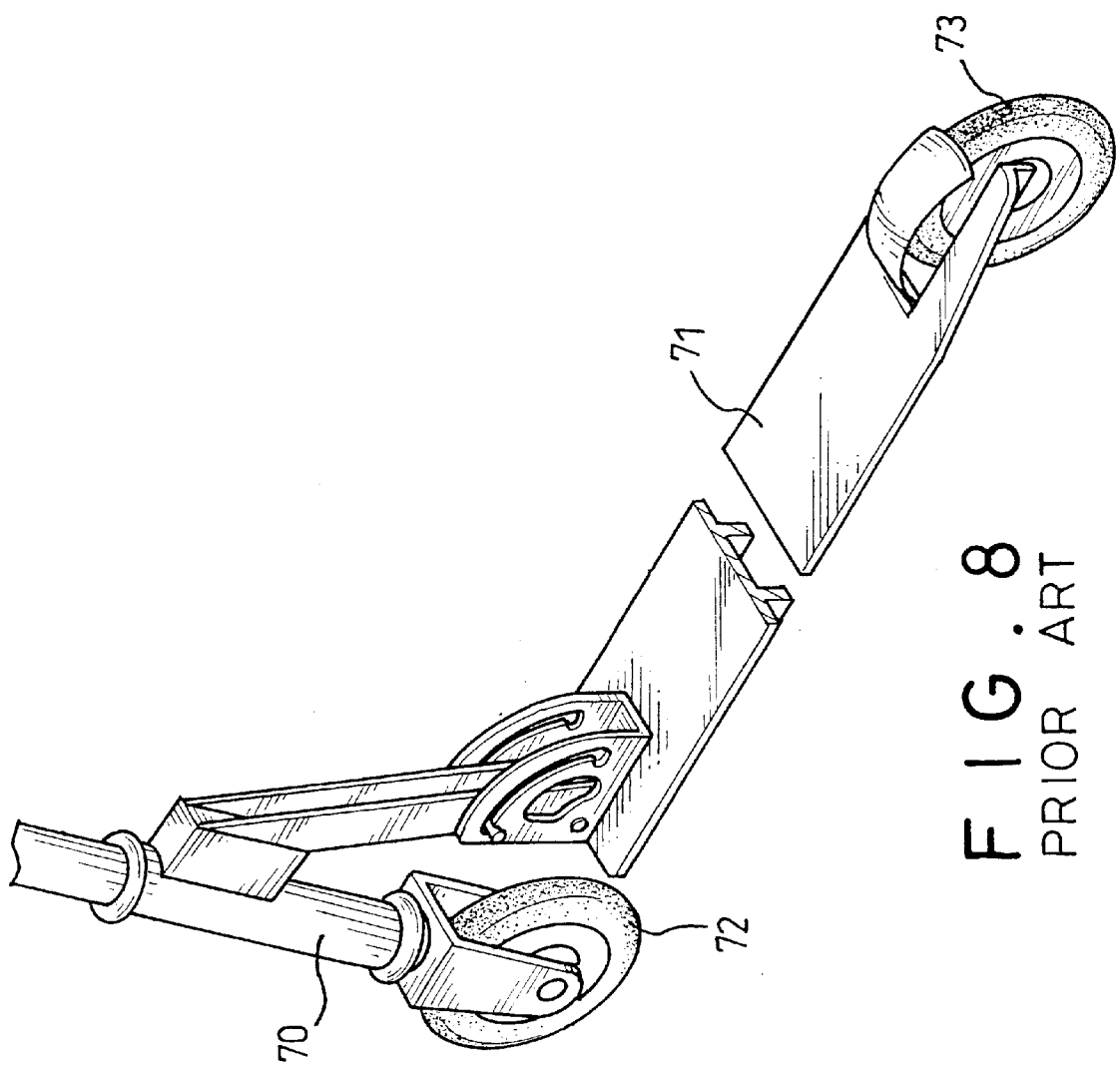
FIG. 8 is a fragmentary perspective view of a conventional scooter.

Referring to FIGS. 6 and 7, an alternative embodiment of the means (30) includes a pair of sprockets (53, 52) mounted side by side around the first shaft (50), with each sprocket (52, 53) having a one-way mechanism (51) that couples the sprocket (52, 53) to the first shaft (50) when the sprocket (52, 53) is rotated in the normal direction and uncouples the sprocket (52, 53) from the first shaft (50) when the sprocket (52, 53) is rotated in the opposite direction.

In front of the first sprocket (53), there is a third sprocket (61) rotatably connected to the chassis (11), such as by a second shaft (60), and a first secondary chain (62) reeved around a bottom edge of the third sprocket (61) and a rear edge of the first sprocket (53). The first secondary chain (62) has a first end attached to the forward end (22) of the pedal (20), and a second end attached to a spring member (63) that is in turn connected to the chassis (11) and substantially under the forward end (22) of the pedal (20), as shown in FIG. 6.

Behind the second sprocket (52), there is a fourth sprocket (64) rotatably connected to the chassis (11), such as by a third shaft (40), and a second secondary chain (65) reeved around a bottom edge of the fourth sprocket (64) and a front edge of the second sprocket (52). The second secondary chain (65) has a first end attached to the backward end (21) of the pedal (20), and a second end attached to a second spring member (66) that is in turn connected to the backward end (21) of the pedal (20).

This arrangement of the secondary chains (62, 65) also enables the sprockets (52, 53, 61, 64) to be rotated with the swaying motion of the pedal (20), especially the first and second sprockets (53, 52) to be rotated in opposite directions, and so the sprockets (53, 52) are complementarily coupled to the first shaft (50) due to the one-way mechanisms (51), resulting in rotation of the first shaft (50) invariably in the correct direction.

In detail, when the rear end (21) of the pedal (20) is pressed down, the front end (22) goes up, as shown in the dashed line in FIG. 6. The first secondary chain (62) is pulled by stretching the spring member (63) in such a direction that the first sprocket (53) is rotated in the normal direction. The first sprocket (53) is then coupled to the first shaft (50) due to its one-way mechanism (51). Thus, the first shaft (50) is rotated in the correct direction with the first sprocket (53), thereby propelling the scooter forward.

When the front end (22) of the pedal (20) is pressed down, the rear end (21) goes up, as shown in the solid line in FIG. 6. The first secondary chain (62) is now pulled back by the stretched spring member (63), and so the first sprocket (53) is rotated in the opposite direction, being uncoupled from the first shaft (50). At the same time, the second secondary chain (65) is pulled by stretching the spring member (66) in such a direction that the second sprocket (52) is rotated in the normal direction and is coupled to the first shaft (50) due to the one-way mechanism (51) of its own. As a result, the first shaft (50) is now rotated in the correct direction with the second sprocket (52), thereby propelling the scooter forward again.

From the foregoing, it is apparent that the inventive scooter can be moved forward by the user standing thereon with his/her feet pressing the ends (21, 22) of the pedal (20) alternately and repeatedly.

It is also apparent to those skilled in the art that the chains (33, 43, 46, 62, 65) may be each embodied as any flexible drive piece, such as a belt, and that the sprockets (13, 32, 36, 45, 42, 34, 420, 53, 52, 61, 64) may be each embodied as any pulley of drive pulley, such as a belt pulley, that is configured to mate with the flexible drive piece.

From the above description, it is noted that the invention has the following advantages:

1. continuous propulsion:

Because of the swaying pedal (20), the scooter can be propelled continuously and can be moved forward at a relative high speed.

2. novel and exciting action:

Because of the swaying pedal (20), the two feet of the user must move up and down, which provides an exciting and novel activity for users.

3. safety

Because the two feet of the user are always on tile pedal (20), the scooter is stable in movement and is highly safe.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A propelling scooter comprising:

a chassis (11) having a front end and a rear end;

a front wheel steerably attached to said front end of said chassis (11);

a rear wheel (12) rotatably attached to said rear end of said chassis (11);

an elongated pedal (20) disposed longitudinally above said chassis (11), said pedal (20) having a backward end (21) and a forward end (22), said pedal (20) being pivotally connected to said chassis (11) on a first shaft between said backward end and said forward end and being adapted to sway forward and backward relative to said chassis (11);

said first shaft (31, 50) laterally extending through and rotatably supported on said chassis (11);

a driving pulley (32) securely mounted around said first shaft (31, 50);

a driven pulley (13) securely attached to a center of said rear wheel (12);

a primary flexible drive piece (33) reeved around said driving pulley (32) and said driven pulley (13) to transmit rotation from said first shaft (31, 50) to said rear wheel (12) such that said scooter may move when said first shaft (31, 50) is rotated relative to said chassis (11) in a first direction; and means (30) for transmitting motion from said pedal (20) to said first shaft (31, 50) in a manner of causing rotation of said first shaft (31, 50) invariably in said first direction when the pedal sways forward and also when the pedal sways backward.

2. The scooter as claimed in claim 1, wherein said means (30) for transmitting motion comprises:

a second shaft (44) laterally extending through and rotatably supported on said chassis (11) and in front of said first shaft (31);

a third shaft (40) laterally extending through and rotatably supported on said chassis (11) and behind said first shaft (31);

a first drive pulley (36) mounted around said first shaft (31), wherein said first drive pulley (36) is formed with a first one-way mechanism (35) for coupling said first drive pulley (36) to said first shaft (31) when said first drive pulley (36) is rotated in said first direction and for uncoupling said first drive pulley (36) from said first shaft (31) when said first drive pulley (36) is rotated in a second direction opposite to said first direction;

a third drive pulley (45) mounted around said second shaft (44);

a fifth drive pulley (42) mounted around said third shaft (40), wherein said fifth drive pulley (42) is formed with a second one-way mechanism (41) for coupling said fifth drive pulley (42) to said third shaft (40) when said fifth drive pulley (42) is rotated in said first direction and for uncoupling said fifth drive pulley (42) from said third shaft (40) when said fifth drive pulley (42) is rotated in the second direction;

a first secondary flexible drive piece (46) reeved around a top edge of said first drive pulley (36) and bottom edges of said third and fifth drive pulleys (45, 42), said first secondary flexible drive piece (46) having two ends attached to said ends (21, 22) of said pedal (20);

a second drive pulley (34) securely mounted around said first shaft (31) and at a side of said first drive pulley (36);

a fourth drive pulley (420) securely mounted around said third shaft (40) and at a side of said fifth drive pulley (42); and a second secondary flexible drive piece (43) reeved around said second and fourth drive pulleys (34, 420) to transmit rotation from said third shaft (40) to said first shaft (31).

3. The scooter as claimed in claim 2, wherein said primary flexible drive piece (33) is a chain, and wherein said driving pulley (32) and driven pulley (13) are sprockets configured to mate with said claim.

4. The scooter as claimed in claim 3, wherein said secondary flexible drive pieces (43, 46) are chains, and wherein said drive pulleys (34, 36, 42, 420, 45) are sprockets configured to mate with said chains, respectively.

5. The scooter as claimed in claim 2, wherein said secondary flexible drive pieces (43, 46) are chains, and wherein said drive pulleys (34, 36, 42, 420, 45) are sprockets configured to mate with said chains, respectively.

6. The scooter as claimed in claim 1, wherein said means (30) for transmitting motion comprises:

a drive pulley (53) mounted around said first shaft (50);

a second drive pulley (52) mounted around said first shaft (50) and at a side of said first drive pulley (53);

each of said first and second drive pulleys (52, 53) being formed with a one-way mechanism (51) for coupling said drive pulley (52, 53) to said first shaft (50) when said respective drive pulley (52, 53) is rotated in said first direction and for uncoupling said respective drive pulley (52, 53) from said first shaft (50) when said respective drive pulley (52, 53) is rotated opposite the first direction;

a third drive pulley (61) rotatably connected to said chassis (11) and in front of said first drive pulley (53);

a first secondary flexible drive piece (62) reeved around a rear edge of said first drive pulley (53) and a bottom edge of said third drive pulley (61), said first secondary flexible drive piece (62) having a first end and a second end, said first end of said first secondary flexible drive piece (62) being attached to said forward end (22) of said pedal (20);

a first spring member (63) having a first end attached to said second end of said first secondary flexible drive piece (62), and a second end of said first spring member attached to said chassis (11) and substantially under said forward end (22) of said pedal (20);

a fourth drive pulley (64) rotatably connected to said chassis (11) and behind said second drive pulley (52);

a second secondary flexible drive piece (65) running around a front edge of said second drive pulley (52) and a bottom edge of said fourth drive pulley (64), said second secondary flexible drive piece (65) having a first end and a second end, said first end of said second secondary flexible drive piece (65) being attached to said backward end (21) of said pedal (20); and a second spring member (66) having a first end attached to said second end of said second secondary flexible drive piece (65), and a second end of said second spring member attached to said backward end (21) of said pedal (20).

7. The scooter as claimed in claim 6, wherein said primary flexible drive piece (33) is a chain, and wherein said driving pulley (32) and driven pulley (13) are sprockets configured to mate with said chain.

8. The scooter as claimed in claim 7, wherein said secondary flexible drive pieces (62, 65) are chains, and wherein said drive pulleys (52, 53, 61, 64) are sprockets configured to mate with said chains, respectively.

9. The scooter as claimed in claim 6, wherein said secondary flexible drive pieces (62, 65) are chains, and wherein said drive pulleys (52, 53, 61, 64) are sprockets configured to mate with said chains, respectively.

10. A propelling scooter comprising:

a chassis having a front end and a rear end;

a front wheel steerably attached to said front end of said chassis;

a rear wheel rotatably attached to said rear end of said chassis;

an elongated pedal disposed longitudinally above said chassis, said pedal having a backward end and a forward end, said pedal being pivotally connected to said chassis on a first shaft between said backward end and said forward end and being adapted to sway relative to said chassis;

said first shaft laterally extending through and rotatably supported on said chassis;

a driving pulley securely mounted around said first shaft;

a driven pulley securely attached to said rear wheel;

a primary flexible drive piece reeved around said driving pulley and said driven pulley to transmit rotation from said first shaft to said rear wheel such that said scooter may move when said first shaft is rotated relative to said chassis in a first direction;

a first drive pulley mounted around said first shaft;

a second drive pulley mounted around said first shaft and at a side of said first drive pulley;

each of said first and second drive pulleys being formed with a one-way mechanism for coupling said first and second drive pulley to said first shaft when said respective drive pulley is rotated in said first direction and for uncoupling said respective drive pulley from said first shaft when said respective drive pulley is rotated opposite the first direction;

a third drive pulley rotatably connected to said chassis and in front of said first drive pulley;

a first secondary flexible drive piece reeved around a rear edge of said first drive pulley and a bottom edge of said third drive pulley, said first secondary flexible drive piece having a first end and a second end, said first end of said first secondary flexible drive piece being attached to said forward end of said pedal;

a first spring member having a first end attached to said second end of said first secondary flexible drive piece, and a second end of said first spring member attached to said chassis;

a fourth drive pulley rotatably connected to said chassis and behind said second drive pulley;

a second secondary flexible drive piece running around a front edge of said second drive pulley and a bottom edge of said fourth drive pulley, said second secondary flexible drive piece having a first end and a second end, said first end of said second secondary flexible drive piece being attached to said pedal; and a second spring member having a first end attached to said second end of said second secondary flexible drive piece, and a second end of said second spring member attached to said pedal.

11. The scooter as claimed in claim 10, wherein said primary flexible drive piece is a chain, and wherein said driving pulley and driven pulley are sprockets configured to mate with said chain.

12. The scooter as claimed in claim 11, wherein said secondary flexible drive pieces are chains, and wherein said drive pulleys are sprockets configured to mate with said chains, respectively.

13. The scooter as claimed in claim 10, wherein said secondary flexible drive pieces are chains, and wherein said drive pulleys are sprockets configured to mate with said chains, respectively.

14. A propelling scooter comprising:

a chassis having a front end and a rear end;

a front wheel steerably attached to said front end of said chassis;

a rear wheel rotatably attached to said rear end of said chassis;

an elongated pedal disposed longitudinally above said chassis, said pedal having a backward end and a forward end, said pedal being pivotally connected to said chassis on a first shaft between said backward end and said forward end and being adapted to sway relative to said chassis;

said first shaft laterally extending through and rotatably supported on said chassis;

a driving pulley securely mounted around said first shaft;

a driven pulley securely attached to said rear wheel;

a primary flexible drive piece reeved around said driving pulley and said driven pulley to transmit rotation from said first shaft to said rear wheel such that said scooter may move when said first shaft is rotated relative to said chassis in a first direction;

a second shaft laterally extending through and rotatably supported on said chassis and in front of said first shaft;

a third shaft laterally extending through and rotatably supported on said chassis and behind said first shaft;

a first drive pulley mounted around said first shaft, wherein said first drive pulley is formed with a first one-way mechanism for coupling said first drive pulley to said first shaft when said first drive pulley is rotated in said first direction and for uncoupling said first drive pulley from said first shaft when said first drive pulley is rotated in a second direction opposite to said first direction;

a second drive pulley securely mounted around said first shaft and at a side of said first drive pulley;

a third drive pulley mounted around said second shaft;

a fourth drive pulley securely mounted around said third shaft;

a fifth drive pulley mounted around said third shaft and at a side of said fourth drive pulley, wherein said fifth drive pulley is formed with a second one-way mechanism for coupling said fifth drive pulley to said third shaft when said fifth drive pulley is rotated in said first direction and for uncoupling said fifth drive pulley from said third shaft when said fifth drive pulley is rotated in the second direction;

a first secondary flexible drive piece reeved around a top edge of said first drive pulley and bottom edges of said third and fifth drive pulleys, said first secondary flexible drive piece having two ends attached to said ends of said pedal; and a second secondary flexible drive piece reeved around said second and fourth drive pulleys to transmit rotation from said third shaft to said first shaft.

15. The scooter as claimed in claim 14, wherein said primary flexible drive piece is a chain, and wherein said driving pulley and driven pulley are sprockets configured to mate with said chain.

16. The scooter as claimed in claim 15, wherein said secondary flexible drive pieces are chains, and wherein said drive pulleys are sprockets configured to mate with said chains, respectively.

17. The scooter as claimed in claim 14, wherein said secondary flexible drive pieces are chains, and wherein said drive pulleys are sprockets configured to mate with said chains, respectively.

* * * * *